(12) United States Patent
Hori et al.

(10) Patent No.: US 8,162,794 B2
(45) Date of Patent: Apr. 24, 2012

(54) MECHANISM FOR CONVERTING ROTATIONAL MOTION INTO LINEAR MOTION

(75) Inventors: Kohei Hori, Kariya (JP); Hiromichi Hashimoto, Toyota (JP); Yasuo Kinoshita, Aichi-ken (JP); Kiyoharu Nakamura, Seto (JP); Motohiro Tsuzukui, Toyota (JP); Osamu Satoh, Takahama (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 737 days.

(21) Appl. No.: 12/308,105

(22) PCT Filed: Jun. 22, 2007

(86) PCT No.: PCT/JP2007/062609
§ 371 (c)(1),
(2), (4) Date: Feb. 3, 2009

(87) PCT Pub. No.: WO2007/148789
PCT Pub. Date: Dec. 27, 2007

(65) Prior Publication Data
US 2009/0288509 A1  Nov. 26, 2009

(30) Foreign Application Priority Data
Jun. 22, 2006 (JP) ................ 2006-173197

(51) Int. Cl.
*F16H 57/08* (2006.01)
(52) U.S. Cl. .......................... 475/331; 74/25
(58) Field of Classification Search .......... 475/219, 475/221, 225, 226, 228, 333, 344; 74/10.25, 74/25, 89.23, 89.3, 89.31, 89.37, 424.75
See application file for complete search history.

(56) References Cited

U.S. PATENT DOCUMENTS

| | | | |
|---|---|---|---|
| 4,526,053 A | 7/1985 | Carson | |
| 5,992,258 A | 11/1999 | Kawase | |
| 8,020,463 B2 * | 9/2011 | Kinoshita et al. | 74/424.92 |
| 8,037,606 B2 | 10/2011 | Nakamura | |
| 2005/0160856 A1 | 7/2005 | Sugitani | |
| 2007/0163525 A1 * | 7/2007 | Fuwa et al. | 123/90.16 |
| 2008/0222892 A1 | 9/2008 | Nakamura | |

FOREIGN PATENT DOCUMENTS

| | | |
|---|---|---|
| EP | 2 037 151 A1 | 3/2009 |
| JP | A-64-500214 | 1/1989 |

(Continued)

OTHER PUBLICATIONS

Office Action issued in U.S. Appl. No. 12/089,541 dated Apr. 14, 2011.

(Continued)

*Primary Examiner* — Justin Holmes
(74) *Attorney, Agent, or Firm* — Oliff & Berridge, PLC

(57) ABSTRACT

A rotation/linear motion conversion mechanism provided with an annular shaft, a sun shaft arranged inside the annular shaft, planetary shafts arranged around the sun shaft, and a first gear mechanism and a second gear mechanism, which transmit force between the annular shaft and the planetary shafts. Each planetary shaft includes a first planetary gear, which configures part of the first gear mechanism, and a second gear, which configures part of the second gear mechanism. The planetary shaft is configured to permit relative rotation between the first planetary gear and the second planetary gear.

15 Claims, 8 Drawing Sheets

FOREIGN PATENT DOCUMENTS

| | | |
|---|---|---|
| JP | A-10-196757 | 7/1998 |
| JP | A-11-159593 | 6/1999 |
| JP | A-2000-500215 | 1/2000 |
| JP | A-2005-325894 | 11/2005 |
| JP | A-2006-64057 | 3/2006 |
| JP | 2007-56952 | 3/2007 |
| JP | A-2007-107594 | 4/2007 |
| SU | 1283465 A1 | 1/1987 |
| WO | WO 88/00295 | 1/1988 |
| WO | WO 97/18406 | 5/1997 |
| WO | WO 2004/094870 A1 | 11/2004 |
| WO | WO 2005/124188 A1 | 12/2005 |
| WO | WO 2007/148790 A1 | 12/2007 |
| WO | WO 2008/015854 A1 | 2/2008 |

OTHER PUBLICATIONS

European Search Report issued in European Patent Application No. 07767418.2 dated Jul. 19, 2011.

U.S. Appl. No. 12/308,472, filed Dec. 16, 2008 in the name of Kinoshita et al.

Dec. 12, 2011 Office Action issued in U.S. Appl. No. 12/308,472.

* cited by examiner

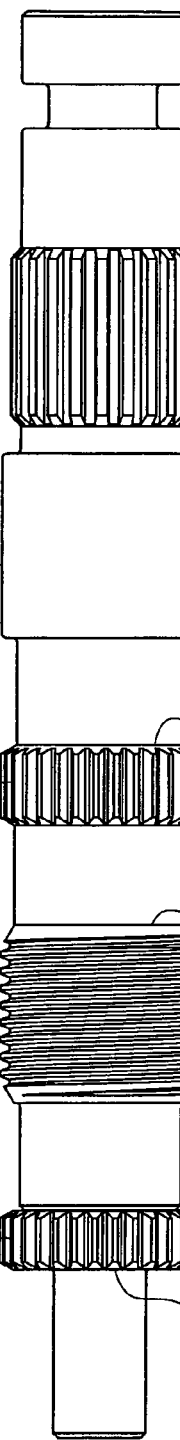
Fig.4(A)
Fig.4(B)

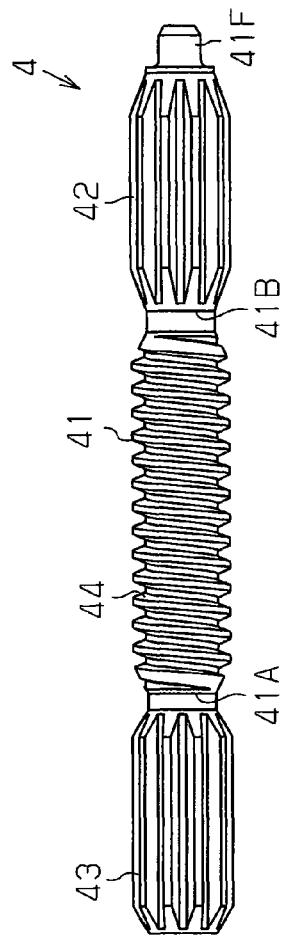
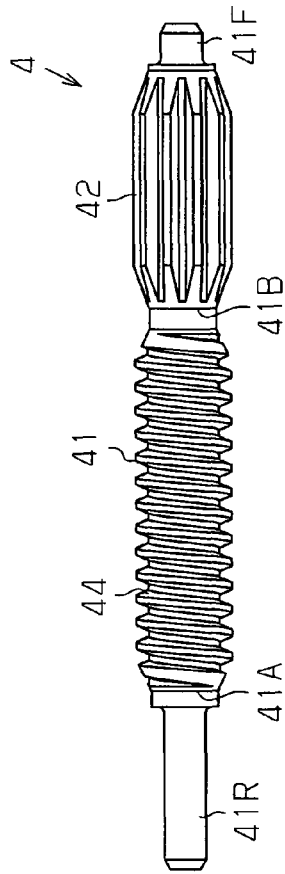
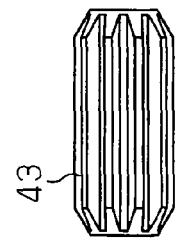
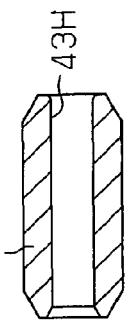
Fig.5(A)
Fig.5(B)
Fig.5(C)

MECHANISM FOR CONVERTING ROTATIONAL MOTION INTO LINEAR MOTION

FIELD OF THE INVENTION

The present invention relates to a rotation/linear motion conversion mechanism for converting rotational motion into linear motion.

BACKGROUND OF THE INVENTION

As a mechanism for converting rotational motion into linear motion, for example, a conversion mechanism disclosed in Patent Document 1 has been proposed. The conversion mechanism includes a annular shaft, which has a space extending in the axial direction therein, a sun shaft, which is arranged inside the annular shaft, and planetary shafts, which are arranged around the sun shaft. Also, externally thread portions formed on the outer circumference of the planetary shafts are engaged with an internally thread portion formed on the inner circumference of the annular shaft, and an externally threaded portion formed on the outer circumference of the sun shaft. Thus, force is transmitted among these components. Sun-and-planet motion of the planetary shafts that is obtained when the annular shaft is rotated causes the sun shaft to move linearly along the axial direction of the annular shaft. That is, the conversion mechanism converts the rotational motion input to the annular shaft into the linear motion of the sun shaft.

In the above mentioned conversion mechanism, two gear mechanisms are provided such that force is transmitted by the engagement of the gear mechanisms in addition to the engagement of the threaded portions between the annular shaft and the planetary shafts. That is, the above-mentioned conversion mechanism includes a gear mechanism which is configured by a first annular gear provided at one end of the annular shaft and a first planetary gear provided at one end of the planetary shaft so as to engage with the first annular gear, and a gear mechanism which is configured by a second annular gear provided at the other end of the annular shaft and a second planetary gear provided at the other end of the planetary shaft so as to engage with the second annular gear.

In the conversion mechanism of the Patent Document 1, when the rotational phase of the first annular gear differs from the rotational phase of the second annular shaft gear, the planetary shafts are arranged between the annular shaft and the sun shaft in an inclined state with respect to a reference position (position where the center lines of the planetary shafts are parallel to the center line of the sun shaft). Thus, the engagement of the threaded portions becomes uneven among the annular shaft, the planetary shafts, and the sun shaft. This increases local wear, thus reducing the conversion efficiency of rotational motion into linear motion. Such a problem occurs not only in the above conversion mechanism but in any conversion mechanism including gear mechanisms configured by the gears of the planetary shafts and the gear of at least one of the annular shaft and the sun shaft. Patent Document 1: International Publication WO2004/094870

SUMMARY OF THE INVENTION

Accordingly, it is an objective of the present invention to provide a rotation/linear motion conversion mechanism that suppresses inclination of planetary shafts caused by engagement of gears of the planetary shafts and a gear of at least one of a annular shaft and a sun shaft.

To achieve the above objective, the first aspect of the present invention provides a rotation/linear motion conversion mechanism, which includes a annular shaft, a sun shaft, a planetary shaft, and a first gear mechanism and a second gear mechanism. The annular shaft is provided with a space extending in an axial direction therein. The sun shaft is arranged inside the annular shaft. The planetary shaft is arranged around the sun shaft. The first gear mechanism and the second gear mechanism transmit force between the annular shaft and the planetary shaft. The conversion mechanism converts rotational motion of one of the annular shaft and the sun shaft into linear motion of and along the axial direction of the other one of the annular shaft and the sun shaft through sun-and-planet motion of the planetary shaft. The planetary shaft includes a first planetary gear, which configures part of the first gear mechanism, and a second gear, which configures part of the second gear mechanism. The planetary shaft is configured to permit relative rotation between the first planetary gear and the second planetary gear.

The second aspect of the present invention provides a rotation/linear motion conversion mechanism, which includes a annular shaft, a sun shaft, a planetary shaft, and a first gear mechanism and a second gear mechanism. The annular shaft is provided with a space extending in an axial direction therein. The sun shaft is arranged inside the annular shaft. The planetary shaft is arranged around the sun shaft. The first gear mechanism and the second gear mechanism transmit force between the planetary shaft and the sun shaft. The conversion mechanism converts rotational motion of one of the planetary shaft and the sun shaft into linear motion of and along the axial direction of the other one of the planetary shaft and the sun shaft through sun-and-planet motion of the planetary shaft. The planetary shaft includes a first planetary gear, which configures part of the first gear mechanism, and a second gear, which configures part of the second gear mechanism. The planetary shaft is configured to permit relative rotation between the first planetary gear and the second planetary gear.

BRIEF DESCRIPTION OF THE DRAWINGS

FIG. 4(A) is a front view illustrating the sun shaft of the conversion mechanism of FIG. 1;

FIG. 4(B) is a front view illustrating a state where part of the sun shaft of FIG. 4(A) is disassembled;

FIG. 5(A) is a front view illustrating the planetary shaft of the conversion mechanism of FIG. 1;

FIG. 5(B) is a front view illustrating a state where part of FIG. 5(A) is disassembled;

FIG. 5(C) is a cross-sectional view taken along the center line of the rear planetary gear of FIG. 5(A);

DETAILED DESCRIPTION OF THE PREFERRED EMBODIMENTS

A first embodiment of the present invention will now be described with reference to FIGS. 1 to 9. Hereinafter, the configuration of a rotation/linear motion conversion mechanism 1 according to the first embodiment, the operation manner of the conversion mechanism 1, and the operation principle of the conversion mechanism 1 will be described in this order.

<Configuration of Conversion Mechanism 1>

Figure 1:
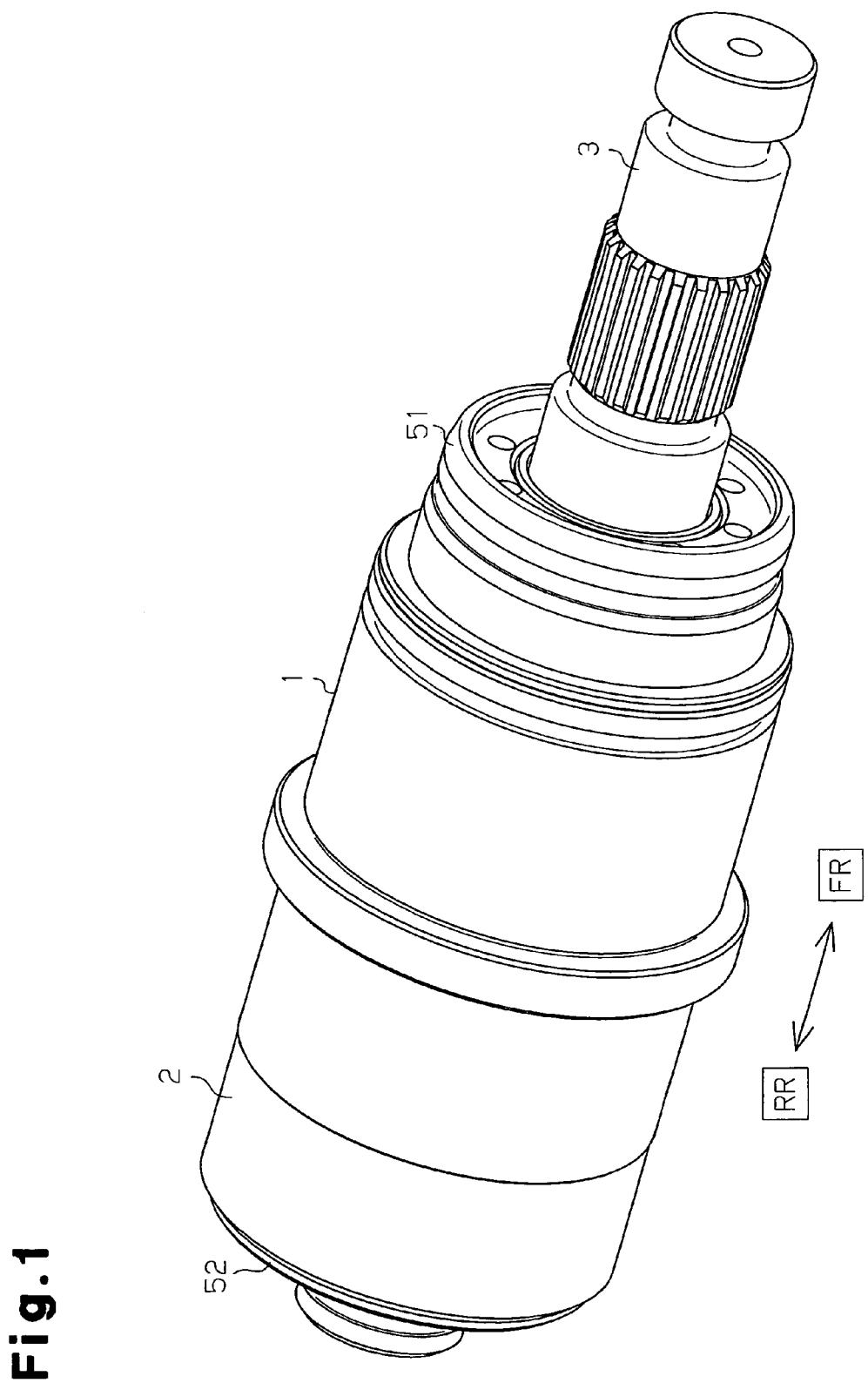
FIG. 1 is a perspective view illustrating a conversion mechanism in a mechanism for converting rotational motion into linear motion according to a first embodiment of the present invention.
Figure 2:
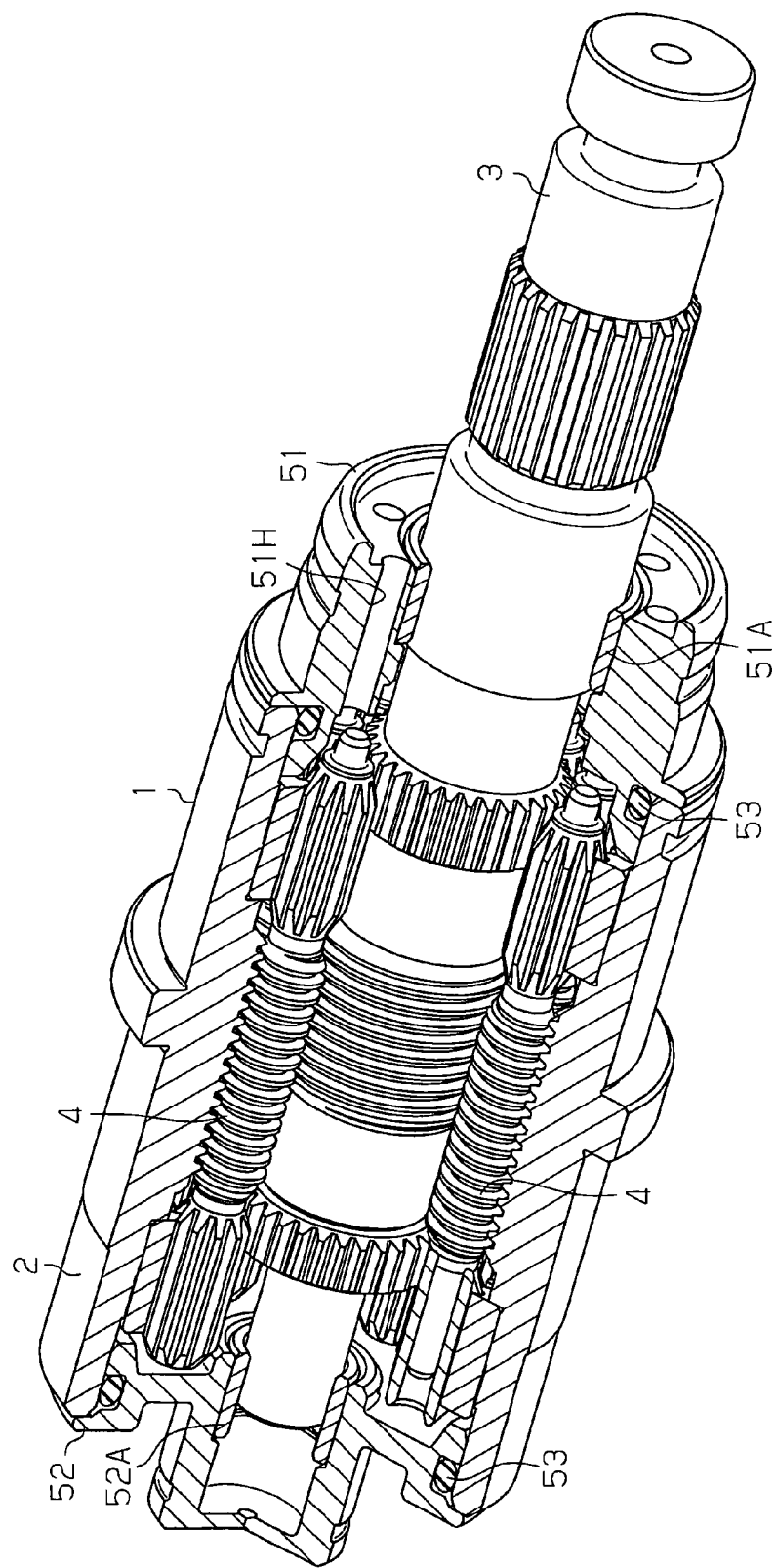
FIG. 2 is a perspective view illustrating the internal structure of the conversion mechanism of FIG. 1.

With reference to FIGS. 1 and 2, the configuration of the conversion mechanism 1 will be briefly described.

The conversion mechanism 1 is configured by combination of a ring shaft 2, which has a space extending in the axial direction therein, a sun shaft 3, which is arranged inside the ring shaft 2, and planetary shafts 4, which are arranged around the sun shaft 3. The ring shaft 2 and the sun shaft 3 are arranged in a state where the center lines are aligned or substantially aligned with each other. The sun shaft 3 and the planetary shafts 4 are arranged in a state where the center lines are parallel or substantially parallel to one another. Also, the planetary shafts 4 are arranged around the sun shaft 3 at equal intervals.

In the first embodiment, the position where the center lines of the components of the conversion mechanism 1 are aligned with or substantially aligned with the center line of the sun shaft 3 will be referred to as an aligned position. Also, the position where the center lines of the components are parallel to or substantially parallel to the center line of the sun shaft 3 will be referred to as a parallel position. That is, the ring shaft 2 is retained in the aligned position. Also, the planetary shafts 4 are retained in the parallel position.

In the conversion mechanism 1, a threaded portion and a gear provided on the ring shaft 2 are engaged with a threaded portion and a gear provided on each of the planetary shafts 4 so that force is transmitted from one component to the other between the ring shaft 2 and the planetary shafts 4. Also, a threaded portion and a gear provided on the sun shaft 3 are engaged with the threaded portion and the gear provided on each of the planetary shafts 4 so that force is transmitted from one component to the other between the sun shaft 3 and the planetary shafts 4.

The conversion mechanism 1 operates as follows based on combination of such components. When one of the components including the ring shaft 2 and the sun shaft 3 is rotated using the center line of the ring shaft 2 (sun shaft 3) as a rotation axis, the planetary shafts 4 perform sun-and-planet motion around the sun shaft 3 by force transmitted from the one of components. Accordingly, by force transmitted from the planetary shafts 4 to the ring shaft 2 and the sun shaft 3, the ring shaft 2 and the sun shaft 3 move with respect to the planetary shafts 4 parallel to the center line of the ring shaft 2 (the sun shaft 3).

In this manner, the conversion mechanism 1 converts rotational motion of one of the ring shaft 2 and the sun shaft 3 to linear motion of the other one of the ring shaft 2 and the sun shaft 3. In the first embodiment, the direction in which the sun shaft 3 is pushed out from the ring shaft 2 along the axial direction of the sun shaft 3 is referred to as a front direction FR, and the direction in which the sun shaft 3 is retracted into the ring shaft 2 is referred to as a rear direction RR. Also, when a given position of the conversion mechanism 1 is taken as a reference, the range toward the front direction FR from the reference position is referred to as a front side, and the range toward the rear direction RR from the reference position is referred to as a rear side.

A front collar 51 and a rear collar 52, which support the sun shaft 3, are secured to the ring shaft 2. The ring shaft 2, the front collar 51, and the rear collar 52 move integrally. In the ring shaft 2, the front side opening portion is closed by the front collar 51. Also, the rear side opening portion is closed by the rear collar 52.

The sun shaft 3 is supported by a bearing 51A of the front collar 51 and a bearing 52A of the rear collar 52. The planetary shafts 4 are not supported by either the front collar 51 or the rear collar 52. That is, in the conversion mechanism 1, while the radial position of the sun shaft 3 is restricted by the engagement of the threaded portions and gears, the front collar 51, and the rear collar 52, the radial position of the planetary shafts 4 is restricted by only the engagement of the threaded portions and gears.

The conversion mechanism 1 employs the following configuration for lubricating the inside of the ring shaft 2 (locations where the threaded portions and gears of the ring shaft 2, the sun shaft 3, and the planetary shafts 4 are engaged with one another) in a suitable manner. Oil holes 51H for supplying lubricant into the ring shaft 2 are formed in the front collar 51. Also, a seal ring 53 for sealing the inside of the ring shaft 2 is mounted on each of the front collar 51 and the rear collar 52. The front collar 51 and the rear collar 52 correspond to bearing elements.

Figure 3A:
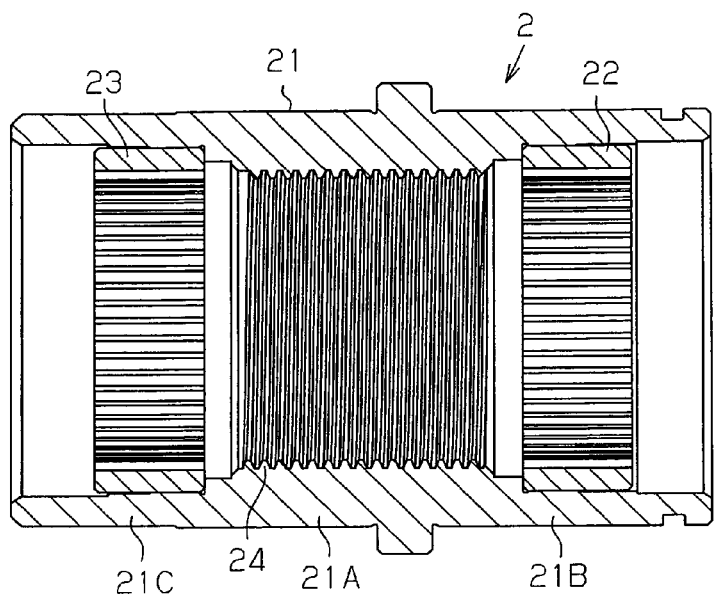
FIG. 3(A) is a cross-sectional view illustrating the ring shaft of the conversion mechanism of FIG. 1.
Figure 3B:
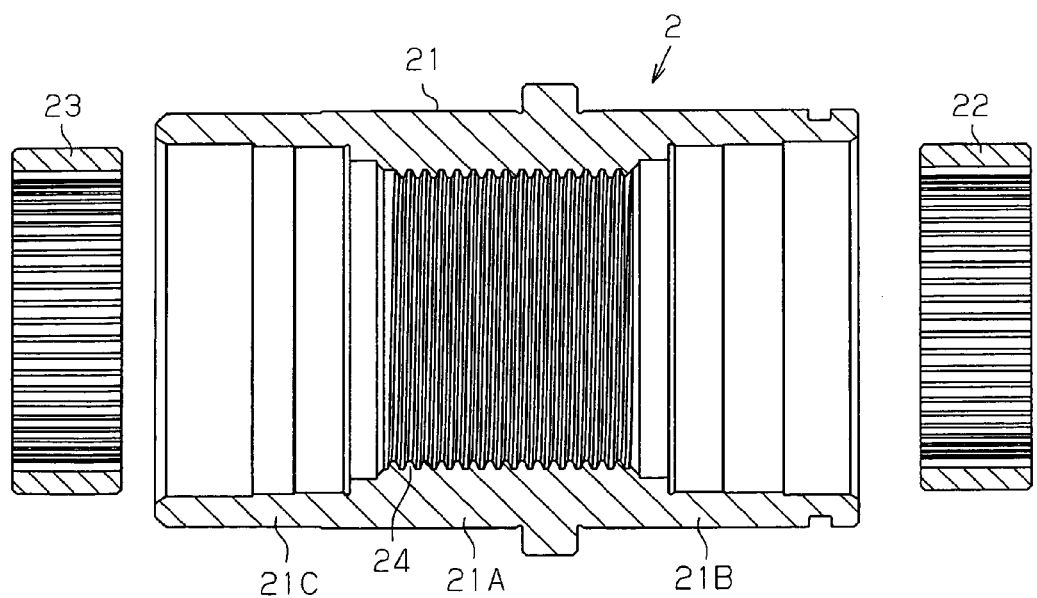
FIG. 3(B) is a cross-sectional view illustrating a state where part of the ring shaft of FIG. 1 is disassembled.
Figure 6:
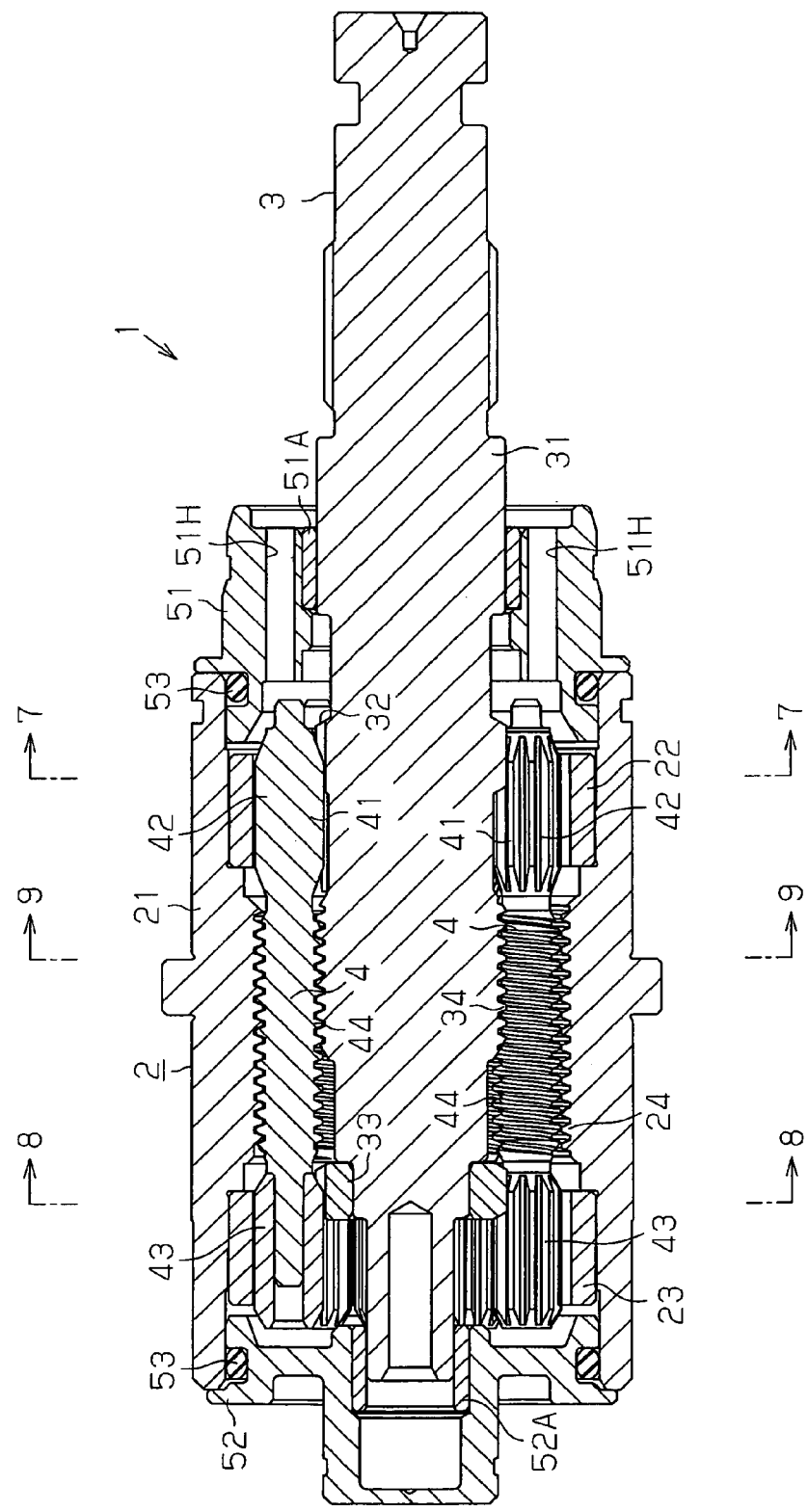
FIG. 6 is a cross-sectional view taken along the center line of the conversion mechanism of FIG. 1.
Figure 7:
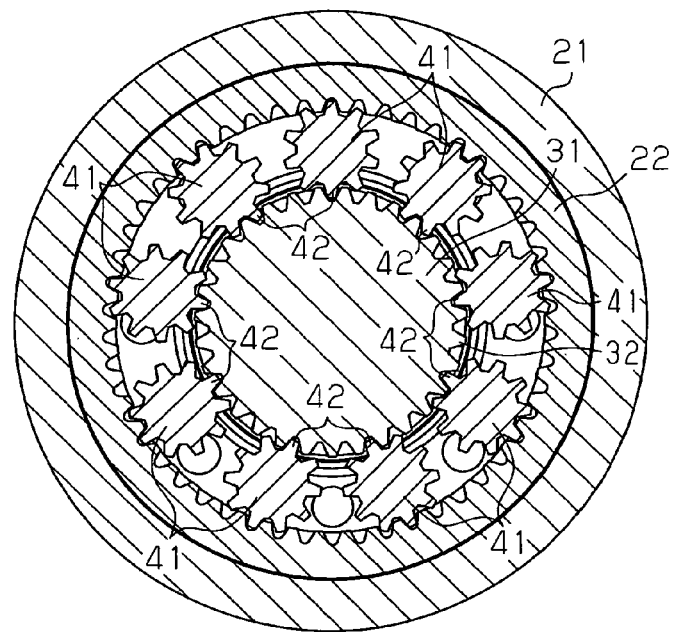
FIG. 7 is a cross-sectional view taken along line 7-7 in FIG. 6 illustrating the conversion mechanism of FIG. 1.
Figure 8:
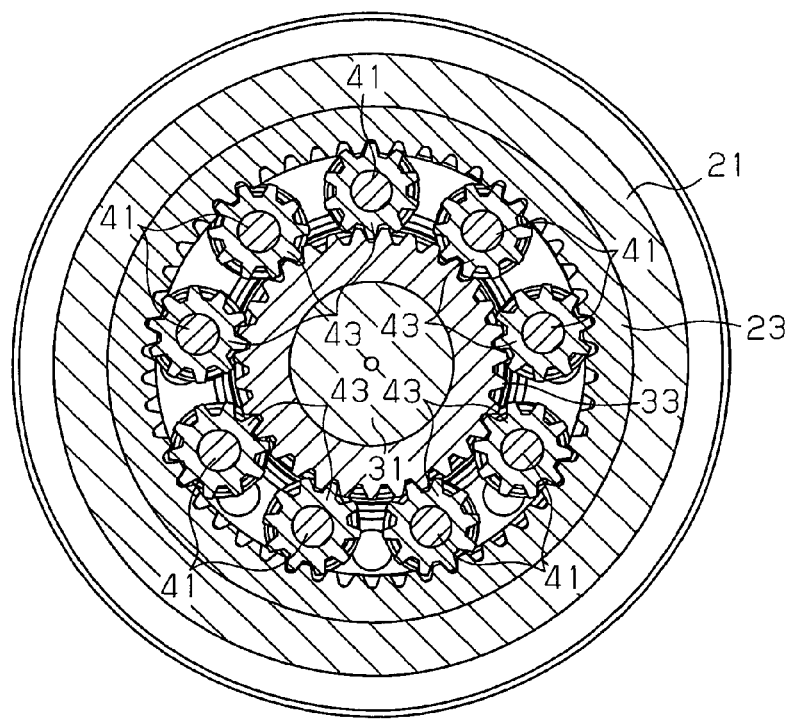
FIG. 8 is a cross-sectional view taken along line 8-8 of FIG. 6 illustrating the conversion mechanism of FIG. 1.
Figure 9:
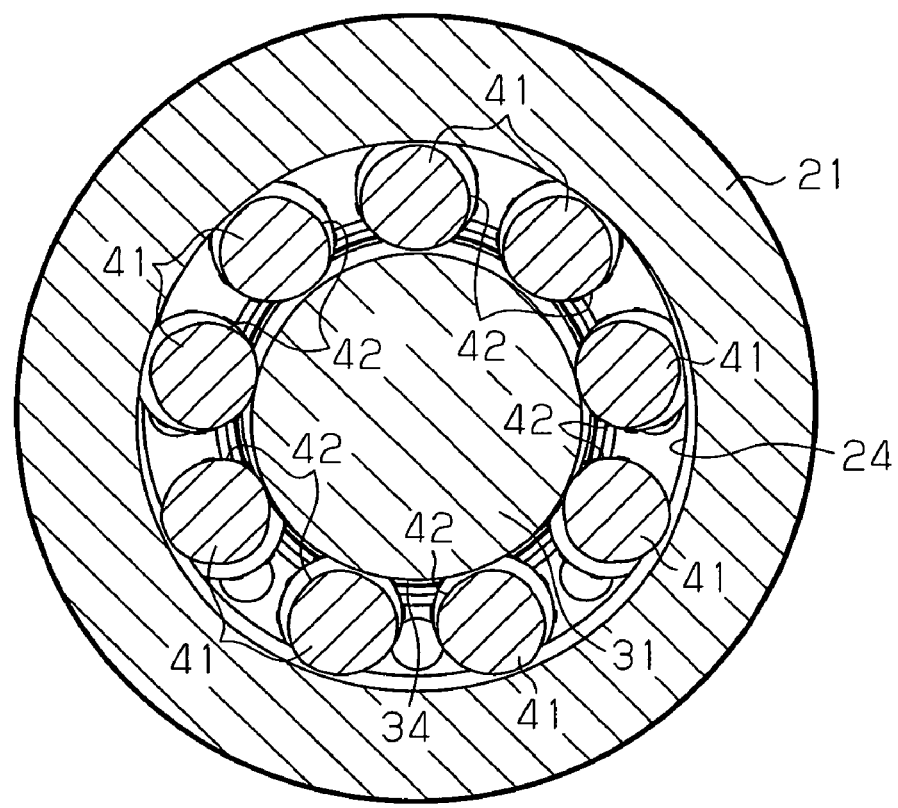
FIG. 9 is a cross-sectional view taken along line 9-9 of FIG. 6 illustrating the conversion mechanism of FIG. 1.

The configuration of the ring shaft 2 will be described with reference to FIG. 3. The ring shaft 2 is configured by combining a ring shaft main body 21 (annular shaft main body), a front ring gear 22 (first annular gear), and a rear ring gear 23 (second annular gear). In the ring shaft 2, the center line (axis) of the ring shaft main body 21 corresponds to the center line (axis) of the ring shaft 2. Therefore, when the center line of the ring shaft main body 21 is aligned or substantially aligned with the center line of the sun shaft 3, the ring shaft 2 is at the aligned position. The front ring gear 22 and the rear ring gear 23 each correspond to an annular gear with internal teeth.

The ring shaft main body 21 includes a main body threaded portion 21A, which is provided with an internally threaded portion 24 formed in the inner circumferential surface, a main body gear portion 21B to which the front ring gear 22 is mounted, and a main body gear portion 21C to which the rear ring gear 23 is mounted.

The front ring gear 22 is formed as an internal gear with spur teeth separately from the ring shaft main body 21. Also, the front ring gear 22 is configured such that its center line is aligned with the center line of the ring shaft main body 21 when mounted on the ring shaft main body 21. As for the mounting manner of the front ring gear 22 to the ring shaft main body 21, the front ring gear 22 is secured to the ring shaft main body 21 by press fitting in the first embodiment. The front ring gear 22 may be secured to the ring shaft main body 21 by a method other than press fitting.

The rear ring gear 23 is formed as an internal gear with spur teeth separately from the ring shaft main body 21. Also, the rear ring gear 23 is configured such that its center line is aligned with the center line of the ring shaft main body 21 when mounted on the ring shaft main body 21. As for the mounting manner of the rear ring gear 23 to the ring shaft main body 21, the rear ring gear 23 is secured to the ring shaft main body 21 by press fitting in the first embodiment. The rear ring gear 23 may be secured to the ring shaft main body 21 by a method other than press fitting.

In the ring shaft 2, the front ring gear 22 and the rear ring gear 23 are configured as gears having the same shapes. That is, the specifications (such as the reference pitch diameter and the number of teeth) of the front ring gear 22 and the rear ring gear 23 are set to the same values.

The sun shaft 3 is configured by combining a sun shaft main body 31 (sun shaft main body) and a rear sun gear 33. In the sun shaft 3, the center line (axis) of the sun shaft main body 31 corresponds to the center line (axis) of the sun shaft 3.

The sun shaft main body 31 is configured by a main body threaded portion 31A, which has an externally threaded portion 34 formed on its outer circumferential surface, a main body gear portion 31B on which a front sun gear 32 (first sun gear) serving as an external gear with spur teeth is formed, and a main body gear portion 31C on which the rear sun gear 33 (second sun gear) is mounted. The front sun gear 32 and the rear sun gear 33 each correspond to a sun gear with external teeth.

The rear sun gear 33 is formed as an external gear with spur teeth separately from the sun shaft main body 31. Also, the rear sun gear 33 is configured such that its center line is aligned with the center line of the sun shaft main body 31 when mounted on the sun shaft main body 31. As for the mounting manner of the rear sun gear 33 to the sun shaft main body 31, the rear sun gear 33 is secured to the sun shaft main body 31 by press fitting in the first embodiment. The rear sun gear 33 may be secured to the sun shaft main body 31 by a method other than press fitting.

In the sun shaft 3, the front sun gear 32 and the rear sun gear 33 are configured as gears having the same shape. That is, the specifications (such as the reference pitch diameter and the number of teeth) of the front sun gear 32 and the rear sun gear 33 are set to the same values.

The configuration of the planetary shafts 4 will be described with reference to FIG. 5. Each planetary shaft 4 is configured by combining a planetary shaft main body 41 (planetary shaft main body) and a rear planetary gear 43. In the planetary shaft 4, the center line (axis) of the planetary shaft main body 41 corresponds to the center line (axis) of the planetary shaft 4. Therefore, when the center line of the planetary shaft main body 41 is parallel or substantially parallel to the center line of the sun shaft 3, the planetary shaft 4 is at the parallel position.

The planetary shaft main body 41 is configured by a main body threaded portion 41A, which is provided with an externally threaded portion 44 formed on its outer circumferential surface, a main body gear portion 41B on which a front planetary gear 42 (first planetary gear) serving as an external gear with spur teeth is formed, a rear shaft 41R on which a rear planetary gear 43 (second planetary gear) is mounted, and a front shaft 41F, which is fitted to a jig during an assembly process of the conversion mechanism 1. Also, the front planetary gear 42 and the rear planetary gear 43 each correspond to a planetary gear with external teeth.

The rear planetary gear 43 is formed as an external gear with spur teeth separately from the planetary shaft main body 41. Also, by inserting the rear shaft 41R of the planetary shaft main body 41 in a bearing hole 43H, the rear planetary gear 43 is mounted on the planetary shaft main body 41. Also, the rear planetary gear 43 is configured such that its center line is aligned with the center line of the planetary shaft main body 41 when mounted on the planetary shaft main body 41.

As for the mounting manner of the rear planetary gear 43 to the planetary shaft main body 41, loose fitting is employed in the first embodiment so that the rear planetary gear 43 is rotatable with respect to the planetary shaft main body 41. As for the mounting manner to permit the planetary shaft main body 41 and the rear planetary gear 43 to rotate relative to each other, a mounting manner other than loose fitting may be employed.

In the planetary shaft 4, the front planetary gear 42 and the rear planetary gear 43 are configured as gears having the same shape. That is, the specifications (such as the reference pitch diameter and the number of teeth) of the front planetary gear 42 and the rear planetary gear 43 are set to the same values.

Referring to FIGS. 6 to 9, the relationship between components of the conversion mechanism 1 will be described. In this specification, the conversion mechanism 1 provided with nine planetary shafts 4 is given as an example, but the number of the planetary shafts 4 may be changed as required.

In the conversion mechanism 1, the operation of the components is permitted or restricted as mentioned bellow in (a) to (c).

(a) As for the ring shaft 2, the ring shaft main body 21, the front ring gear 22, and the rear ring gear 23 are prevented from rotating relative to one another. Also, the ring shaft main body 21, the front collar 51, and the rear collar 52 are prevented from rotating relative to one another.

(b) As for the sun shaft 3, the sun shaft main body 31 and the rear sun gear 33 are prevented from rotating relative to each other.

(c) As for the planetary shaft 4, the planetary shaft main body 41 and the rear planetary gear 43 are permitted to rotate relative to each other.

In the conversion mechanism 1, the sun shaft 3, and the planetary shafts 4, force is transmitted among the components as follows through engagement of the threaded portion and the gears of the ring shaft 2.

As for the ring shaft 2 and the planetary shafts 4, the internally threaded portion 24 of the ring shaft main body 21 and the externally threaded portion 44 of each planetary shaft main body 41 are engaged with each other. Also, the front ring gear 22 of the ring shaft main body 21 and the front planetary gear 42 of each planetary shaft main body 41 are engaged with each other. Also, the rear ring gear 23 of the ring shaft main body 21 and the rear planetary gear 43 of each planetary shaft main body 41 are engaged with each other.

Thus, when rotational motion is input to either the ring shaft 2 or the planetary shafts 4, force is transmitted to the other one of the ring shaft 2 and the planetary shafts 4 through the engagement of the internally threaded portion 24 and the externally threaded portions 44, the engagement of the front ring gear 22 and the front planetary gears 42, and the engagement of the rear ring gear 23 and the rear planetary gears 43.

In the sun shaft 3 and the planetary shafts 4, the externally threaded portion 34 of the sun shaft main body 31 and the externally threaded portion 44 of each planetary shaft main body 41 are engaged with each other. Also, the front sun gear 32 of the sun shaft main body 31 and the front planetary gear 42 of each planetary shaft main body 41 are engaged with each other. Also, the rear sun gear 33 of the sun shaft main body 31 and the rear planetary gear 43 of each planetary shaft main body 41 are engaged with each other.

Thus, when rotational motion is input to either the sun shaft 3 or the planetary shafts 4, force is transmitted to the other one of the sun shaft 3 and the planetary shafts 4 through the engagement of the externally threaded portion 34 and the externally threaded portions 44, the engagement of the front sun gear 32 and the front planetary gears 42, and the engagement of the rear sun gear 33 and the rear planetary gears 43.

As described above, the conversion mechanism 1 includes a deceleration mechanism configured by the internally threaded portion 24 of the ring shaft 2, the externally threaded portion 34 of the sun shaft 3, and the externally threaded portions 44 of the planetary shafts 4, a deceleration mechanism (first gear mechanism) configured by the front ring gear 22, the front sun gear 32, and the front planetary gears 42, and a deceleration mechanism (second gear mechanism) configured by the rear ring gear 23, the rear sun gear 33, and the rear planetary gears 43.

<Operation Manner of Conversion Mechanism 1>

In the conversion mechanism 1, of threads of each threaded portion, the operation mode (motion converting mode) for converting the rotational motion into the linear motion is determined based on the setting manner of the number of teeth of each gear and the number. That is, as the motion converting mode, either a sun shaft displacement mode, in which the sun shaft 3 is linearly moved by the rotational motion of the ring shaft 2, or an annular shaft displacement mode, in which the ring shaft 2 is linearly moved by the rotational motion of the sun shaft 3, is selected. Hereinafter, the operation manner of the conversion mechanism 1 in each motion converting mode will be described.

(A) When the sun shaft displacement mode is employed as the motion converting mode, rotational motion is converted into linear motion as follows. When rotational motion is input to the ring shaft 2, force is transmitted from the ring shaft 2 to the planetary shafts 4 through the engagement of the front ring gear 22 and the front planetary gears 42, the engagement of the rear ring gear 23 and the rear planetary gears 43, and the engagement of the internally threaded portion 24 and the externally threaded portions 44. Thus, the planetary shafts 4 rotate with their central axes serving as the rotational centers around the sun shaft 3, and revolve about the sun shaft 3 with the central axis of the sun shaft 3 serving as the rotational center. Accompanying the sun-and-planet motion of the planetary shafts 4, force is transmitted from the planetary shafts 4 to the sun shaft 3 through the engagement of the front planetary gears 42 and the front sun gear 32, the engagement of the rear planetary gears 43 and the rear sun gear 33, and the engagement of the externally threaded portions 44 and the externally threaded portion 34. Accordingly, the sun shaft 3 is displaced in the axial direction.

(B) When the annular shaft displacement mode is employed as the motion converting mode, the rotational motion is converted into the linear motion as follows. When rotational motion is input to the sun shaft 3, force is transmitted from the sun shaft 3 to the planetary shafts 4 through the engagement of the front sun gear 32 and the front planetary gears 42, the engagement of the rear sun gear 33 and the rear planetary gears 43, and the engagement of the externally threaded portion 34 and the externally threaded portions 44. Thus, the planetary shafts 4 rotate with their central axes serving as the rotational centers around the sun shaft 3, and revolve about the sun shaft 3 with the central axis of the sun shaft 3 serving as the rotational center. Accompanying the sun-and-planet motion of the planetary shafts 4, force is transmitted from the planetary shafts 4 to the ring shaft 2 through the engagement of the front planetary gears 42 and the front ring gear 22, the engagement of the rear planetary gears 43 and the rear ring gear 23, and the engagement of the externally threaded portions 44 and the internally threaded portion 24. Thus, the ring shaft 2 is displaced in the axial direction.

<Operation Principle of Conversion Mechanism 1>

The operation principle of the conversion mechanism 1 will now be described. Hereinafter, the reference pitch diameter and the number of teeth of the gears of the ring shaft 2, the sun shaft 3, and the planetary shafts 4 are expressed as shown in the following (A) to (F). Also, the reference pitch diameter and the number of threads of the thread portions of the ring shaft 2, the sun shaft 3, and the planetary shafts 4 are expressed as shown in the following (a) to (f).

"The Reference Pitch Diameter and the Number of Teeth of gears"

(A) Effective diameter of annular gear DGr: the reference pitch diameter of the ring gears 22, 23.

(B) Effective diameter of sun gear DGs: the reference pitch diameter of the sun gears 32, 33.

(C) Effective diameter of planetary gear DGp: the reference pitch diameter of the planetary gears 42, 43.

(D) Number of teeth of annular gear ZGr: the number of teeth of the ring gears 22, 23.

(E) Number of teeth of sun gear ZGs: the number of teeth of the sun gears 32, 33.

(F) Number of teeth of planetary gear ZGp: the number of teeth of the planetary gears 42, 43.

"The Reference Pitch Diameter and the Number of Threads of Threaded Portions"

(a) Effective diameter of annular threaded portion DSr: the reference pitch diameter of the internally threaded portion 24 of the ring shaft 2.

(b) Effective diameter of sun threaded portion DSs: the reference pitch diameter of the externally threaded portion 34 of the sun shaft 3.

(c) Effective diameter of planetary threaded portion DSp: the reference pitch diameter of the externally threaded portions 44 of the planetary shafts 4.

(d) Number of threads of annular threaded portion ZSr: the number of threads of the internally threaded portion 24 of the ring shaft 2.

(e) Number of threads of sun threaded portion ZSs: the number of threads of the externally threaded portion 34 of the sun shaft 3.

(f) Number of threads of planetary threaded portion ZSp: the number of threads of the externally threaded portions 44 of the planetary shafts 4.

In the conversion mechanism 1, when the sun shaft 3 is displaced with respect to the planetary shafts 4 in the axial direction, the ratio of the number of threads of the sun threaded portion ZSs to the number of threads of planetary threaded portion ZSp (sun to planetary number of threads ratio ZSA) differs from the ratio of the number of teeth of sun gear ZGs to the number of teeth of planetary gear ZGp (sun to planetary number of teeth ratio ZGA). The ratio of the number of threads of annular threaded portion ZSr to the number of threads of planetary threaded portion ZSp (annular to planetary number of threads ratio ZSB) is equal to the ratio of the number of teeth of annular gear ZGr to the number of teeth of planetary gear ZGp (annular to planetary number of teeth ratio ZGB). That is, the following [expression 11] and [expression 12] are satisfied.

$$ZSs/ZSp \neq ZGs/ZGp \qquad \text{[expression 11]}$$

$$ZSr/ZSp = ZGr/ZGp \qquad \text{[expression 12]}$$

In the conversion mechanism 1, when the ring shaft 2 is displaced with respect to the planetary shafts 4 in the axial direction, the ratio of the number of threads of annular threaded portion ZSr to the number of threads of planetary threaded portion ZSp (annular to planetary number of threads ratio ZSB) differs from the ratio of the number of teeth of annular gear ZGr to the number of teeth of planetary gear ZGp (annular to planetary number of teeth ratio ZGB). The ratio of the number of threads of sun threaded portion ZSs to the number of threads of planetary threaded portion ZSp (sun to planetary number of threads ratio ZSA) is equal to the ratio of the number of teeth of sun gear ZGs to the number of teeth of planetary gear ZGp (sun to planetary number of teeth ratio ZGA). That is, the following [expression 21] and [expression 22] are satisfied.

$$ZSr/ZSp \neq ZGr/ZGp \qquad \text{[expression 21]}$$

$$ZSs/ZSp = ZGs/ZGp \qquad \text{[expression 22]}$$

Here, the deceleration mechanism configured by the internally threaded portion 24, the externally threaded portion 34, and the externally threaded portions 44 will be referred to as a first planetary deceleration mechanism, and the deceleration mechanism configured by the ring gears 22, 23, the sun gears 32, 33, and the planetary gears 42, 43 will be referred to as a second planetary deceleration mechanism.

When the sun shaft 3 is displaced with respect to the planetary shafts 4 in the axial direction, the sun to planetary number of thread ratio ZSA of the first planetary deceleration mechanism differs from the sun to planetary number of teeth ratio ZGA of the second planetary deceleration mechanism, as shown by [expression 11] and [expression 12]. When the ring shaft 2 is displaced with respect to the planetary shafts 4 in the direction along the axial direction of the ring shaft 2, the annular to planetary number of threads ratio ZSB of the first planetary deceleration mechanism differs from the annular to planetary number of teeth ratio ZGB of the second planetary deceleration mechanism, as shown by [expression 21] and [expression 22].

As a result, in either of the above cases, force acts between the first planetary deceleration mechanism and the second planetary deceleration mechanism to generate difference in the rotational angle by an amount corresponding to the difference between the number of threads ratio and the number of teeth ratio. However, since the threaded portions of the first planetary deceleration mechanism and the gears of the second planetary deceleration mechanism are configured integrally, difference in the rotational angle cannot be generated between the first planetary deceleration mechanism and the second planetary deceleration mechanism. Thus, the sun shaft 3 or the ring shaft 2 is displaced with respect to the planetary shafts 4 in the axial direction to absorb the difference in the rotational angle. At this time, the component that is displaced in the axial direction (sun shaft 3 or ring shaft 2) is determined as follows.

(a) When the ratio of the number of threads of sun threaded portion ZSs to the number of threads of planetary threaded portion ZSp differs from the ratio of the number of teeth of sun gear ZGs to the number of teeth of planetary gear ZGp, the sun shaft 3 is displaced with respect to the planetary shafts 4 in the axial direction.

(b) When the ratio of the number of threads of annular threaded portion ZSr to the number of threads of planetary threaded portion ZSp differs from the ratio of the number of teeth of annular gear ZGr to the number of teeth of planetary gear ZGp, the ring shaft 2 is displaced with respect to the planetary shafts 4 in the axial direction.

In this manner, the conversion mechanism 1 utilizes the difference in the rotational angle generated in accordance with the difference between the number of threads ratio and the number of teeth ratio of the sun shaft 3 or the ring shaft 2 in relation to the planetary shafts 4 between two kinds of planetary deceleration mechanisms, and obtains displacement in the axial direction corresponding to the difference in the rotational angle through the threaded portions, thereby converting rotational motion into linear motion.

<Setting Manner of Number of Teeth and Number of Threads>

In the conversion mechanism 1, by setting at least one of "the number of effective teeth" and "the number of effective threads" described below to a value other than "0" for either the ring shaft 2 or the sun shaft 3, the linear motion of the sun shaft 3 based on the relationship between the sun to planetary number of threads ratio ZSA and the sun to planetary number of teeth ratio ZGA, or the linear motion of the ring shaft 2 based on the relationship between the annular to planetary number of threads ratio ZSB and the annular to planetary number of teeth ratio ZGB is obtained.

[1] "Setting of Number of Effective Teeth"

In a typical planetary deceleration mechanism (planetary gear type deceleration mechanism) configured by a ring gear, a sun gear, and planetary gears, that is, in a planetary gear type deceleration mechanism that decelerates rotation through the engagement of gears, the relationships represented by the following [expression 31] to [expression 33] are satisfied. The [expression 31] represents the relationship established among the reference pitch diameters of the ring gear, the sun gear, and the planetary gears. The [expression 32] represents the relationship established among the numbers of teeth of the ring gear, the sun gear, and the planetary gears. The [expression 33] represents the relationship established among the reference pitch diameters and the numbers of teeth of the ring gear, the sun gear, and the planetary gear.

$$DAr = DAs + 2 \times DAp \qquad \text{[expression 31]}$$

$$ZAr = ZAs + 2 \times ZAp \qquad \text{[expression 32]}$$

$$DAr/ZAr = DAs/ZAs = DAp/ZAp \qquad \text{[expression 33]}$$

DAr: reference pitch diameter of ring gear
DAs: reference pitch diameter of sun gear
DAp: reference pitch diameter of planetary gear
ZAr: the number of teeth of ring gear
ZAs: the number of teeth of sun gear
ZAp: the number of teeth of planetary gear In the conversion mechanism 1 of the first embodiment, assuming that the second planetary deceleration mechanism, that is, the deceleration mechanism configured by the ring gears 22, 23, the sun gears 32, 33, and the planetary gears 42, 43 has the same configuration as the above-mentioned planetary gear type deceleration mechanism, the relationship established among the reference pitch diameters of the gears, the relationship established among the number of teeth of the gears, and the relationship established among the reference pitch diameter and the number of teeth of the gears are represented by the following [expression 41] to [expression 43].

$$DGr = DGs + 2 \times DGp \qquad \text{[expression 41]}$$

$$ZGr = ZGs + 2 \times ZGp \qquad \text{[expression 42]}$$

$$DGr/ZGr = DGs/ZGs = DGp/ZGp \qquad \text{[expression 43]}$$

In a case where the number of teeth of the ring gears 22, 23, the sun gears 32, 33, and the planetary gears 42, 43 when the relationships represented by [expression 41] to [expression 43] are satisfied is referred to as the reference numbers of teeth, "the number of effective teeth" is expressed as the difference between the number of teeth and the reference number of teeth of each gear. In the conversion mechanism 1, by setting the number of effective teeth of one of the ring shaft 2 and the sun shaft 3 to a value other than "0", the ring shaft 2 or the sun shaft 3 can be moved linearly. That is, when the reference number of teeth of the ring gears 22, 23 is represented by a reference number of annular teeth ZGR, and the reference number of teeth of the sun gears 32, 33 is represented by a reference number of sun teeth ZGS, by setting the number of teeth of the ring gears 22, 23 or the sun gears 32, 33 such that one of the following [expression 44] and [expression 45] is satisfied, the ring shaft 2 or the sun shaft 3 can be moved linearly.

$$ZGr-ZGR \ne 0 \quad \text{[expression 44]}$$

$$ZGs-ZGS \ne 0 \quad \text{[expression 45]}$$

When [expression 44] is satisfied, the ring shaft 2 is moved linearly. When [expression 45] is satisfied, the sun shaft 3 is moved linearly. The specific setting manner is shown in "Specific Example of Setting Manner of Number of Teeth and Number of Threads".

[2] "Setting of Number of Effective Threads"

In the planetary deceleration mechanism (planetary thread type deceleration mechanism) that is identical to the above-mentioned planetary gear type deceleration mechanism and configured by an annular threaded portion corresponding to the ring gear, a sun threaded portion corresponding to the sun gear, and planetary threaded portions corresponding to the planetary gears, that is, in the planetary thread type deceleration mechanism that only decelerates rotation like the above-mentioned planetary gear type deceleration mechanism through the engagement of the threaded portions, the relationships represented by the following [expression 51] to [expression 53] are satisfied. The [expression 51] represents the relationship established among the reference pitch diameters of the annular threaded portion, the sun threaded portion, and the planetary threaded portions. The [expression 52] represents the relationship established among the number of teeth of the annular threaded portion, the sun threaded portion, and the planetary threaded portions. The [expression 53] represents the relationship established among the reference pitch diameter and the number of teeth of the annular threaded portion, the sun threaded portion, and the planetary threaded portions.

$$DBr=DBs+2 \times DBp \quad \text{[expression 51]}$$

$$ZBr=ZBs+2 \times ZBp \quad \text{[expression 52]}$$

$$DBr/ZBr=DBs/ZBs=DBp/ZBp \quad \text{[expression 53]}$$

DBr: reference pitch diameter of annular threaded portion
DBs: reference pitch diameter of sun threaded portion
DBp: reference pitch diameter of planetary threaded portion
ZBr: number of threads of annular threaded portion
ZBs: number of threads of sun threaded portion
ZBp: number of threads of planetary threaded portion In the conversion mechanism 1 of the first embodiment, assuming that the first planetary deceleration mechanism has the same configuration as the above-mentioned planetary thread type deceleration mechanism, the relationship established among the reference pitch diameters of the threaded portions, the relationship established among the numbers of threads of the threaded portions, and the relationship established among the reference pitch diameters and the numbers of threads of the threaded portions are expressed by the following [expression 61] to [expression 63].

$$DGr=DGs+2 \times DGp \quad \text{[expression 61]}$$

$$ZGr=ZGs+2 \times ZGp \quad \text{[expression 62]}$$

$$DGr/ZGr=DGs/ZGs=DGp/ZGp \quad \text{[expression 63]}$$

In a case where the number of threads of the internally threaded portion 24 of the ring shaft 2, the externally threaded portion 34 of the sun shaft 3, and the externally threaded portions 44 of the planetary shafts 4 when the relationships of the above [expression 61] to [expression 63] are satisfied is referred to as the reference number of threads, "the number of effective threads" is represented as the difference between the number of threads of each threaded portion and the reference number of threads. In the conversion mechanism 1, by setting the number of effective threads of one of the ring shaft 2 and the sun shaft 3 to a value other than "0", the ring shaft 2 or the sun shaft 3 is moved linearly. That is, when the reference number of threads of the internally threaded portion 24 of the ring shaft 2 is represented by a reference number of annular threads ZSR, and the reference number of threads of the externally threaded portion 34 of the sun shaft 3 is represented by a reference number of sun threads ZSS, the ring shaft 2 or the sun shaft 3 is moved linearly by setting the number of threads such that one of the following [expression 64] and [expression 65] is satisfied.

$$ZSr-ZSR \ne 0 \quad \text{[expression 64]}$$

$$ZSs-ZSS \ne 0 \quad \text{[expression 65]}$$

When [expression 64] is satisfied, the ring shaft 2 is moved linearly. When [expression 65] is satisfied, the sun shaft 3 is moved linearly. The specific setting manner is shown in "Specific Example of Setting Manner of Number of Teeth and Number of Threads".

<Number of Planetary Shafts>

In a typical planetary gear type deceleration mechanism, the number of the planetary gears is a divisor of the sum of the number of teeth of the sun gear and the number of teeth of the annular gear. Thus, the number of the planetary shafts 4 (planetary number Np) in the conversion mechanism 1 is a common divisor of "divisors of the sum of the number of threads of sun threaded portion ZSs and the number of threads of annular threaded portion ZSr" and "divisors of the sum of the number of teeth of sun gear ZGs and the number of teeth of annular gear ZGr".

<Relationship between Number of Teeth Ratio and Effective Diameter Ratio of Gears>

In the conversion mechanism 1, the threaded portions and the gears are simultaneously engaged by setting the ratio of the number of teeth of annular gear ZGr, the number of teeth of sun gear ZGs, and the number of teeth of planetary gear ZGp (total number of teeth ratio ZGT) to be equal to the ratio of the effective diameter of annular gear DGr, the effective diameter of sun gear DGs, and the effective diameter of planetary gear DGp (total effective diameter ratio ZST). That is, by setting the number of teeth of the gears and the number of threads of the threaded portions such that the relationship of the following [expression 71] is satisfied, the threaded portions and the gears are simultaneously engaged.

$$ZGr:ZGs:ZGp=DGr:DGs:DGp \quad \text{[expression 71]}$$

In this case, however, since the rotational phases of the planetary shafts 4 are the same, the starting and ending of the engagement of the planetary gears 42, 43, the ring gears 22, 23, and the sun gears 32, 33 accompanying the rotation coincide. This causes torque fluctuation due to the engagement of the gears, which may increase the operational noise and reduce the durability of the gears.

Thus, in the conversion mechanism 1, the total number of teeth ratio ZGT and the total effective diameter ratio ZST are set to different values within the range in which the following conditions (A) to (C) are satisfied. The total number of teeth ratio ZGT and the total effective diameter ratio ZST may be set to different values within the range in which at least one of the conditions (A) to (C) is satisfied.

(A) In a case where the number of teeth of sun gear ZGs when the relationship of [expression 71] is satisfied is referred to as a reference number of sun teeth ZGSD, the actual number of teeth of sun gear ZGs differs from the reference number of sun teeth ZGSD.

(B) In a case where the number of teeth of annular gear ZGr when the relationship of [expression 71] is satisfied is referred to as a reference number of annular teeth ZGRD, the actual number of teeth of annular gear ZGr differs from the reference number of annular teeth ZGRD.

(C) The planetary number Np differs from a divisor of the number of teeth of planetary gear ZGp, that is, the planetary number Np and the number of teeth of planetary gear ZGp does not have a divisor other than "1".

Since this achieves the operation manner in which the threaded portions and the gears are simultaneously engaged, and the operation manner in which the rotational phases of the planetary shafts 4 differ from one another, torque fluctuation caused by the engagement of the gears is suppressed.

<Specific Examples of Setting Manner of Number of Teeth and Number of Threads>

Main items representing the specifications of the conversion mechanism 1 are provided in the following items (A) to (I) including the number of effective threads and the number of effective teeth.

(A) Motion converting mode
(B) Relationship of sun/planetary threaded portions
(C) Number of the planetary shafts
(D) Number of threads ratio of threaded portions
(E) Number of teeth ratio of gears
(F) Effective diameter ratio of threaded portions
(G) Effective diameter ratio of gears
(H) Number of effective threads
(I) Number of effective teeth The details of the above items will be described below.

The "motion converting mode" of (A) represents the operation mode for converting rotational motion into linear motion. That is, when linearly moving the sun shaft 3 by the rotational motion of the ring shaft 2, the motion converting mode is in the "sun shaft displacement mode". When linearly moving the ring shaft 2 by the rotational motion of the sun shaft 3, the motion converting mode is in the "annular shaft displacement mode".

The "relationship of sun/planetary threaded portions" of (B) represents the relationship of the torsion direction between the externally threaded portion 34 of the sun shaft 3 and the externally threaded portions 44 of the planetary shafts 4. That is, when the torsion direction of the externally threaded portion 34 of the sun shaft 3 and the torsion direction of the externally threaded portions 44 of the planetary shafts 4 are opposite to each other, the relationship of sun/planetary threaded portions is a "reverse direction". Also, when the torsion direction of the externally threaded portion 34 of the sun shaft 3 and the torsion direction of the externally threaded portions 44 of the planetary shafts 4 are the same as each other, the relationship of the sun/planetary threaded portions is a "forward direction".

The "number of planetary shafts" of (C) represents the number of the planetary shafts 4 arranged around the sun shaft 3.

The "number of threads ratio of threaded portions" of (D) represents the ratio of the number of threads of sun threaded portion ZSs, the number of threads of planetary threaded portion ZSp, and the number of threads of annular threaded portion ZSr. That is, the "number of threads ratio of threaded portions" is "ZSs:ZSp:ZSr".

The "number of teeth ratio of gears" of (E) represents the ratio of the number of teeth of the sun gear ZGs, the number of teeth of the planetary gear ZGp, and the number of teeth of the annular gear ZGr. That is, the number of teeth ratio of the gears is ZGs:ZGp:ZGr.

The "Effective diameter ratio of threaded portions" of (F) represents the ratio of the effective diameter of sun threaded portion DSs, the effective diameter of planetary threaded portion DSp, and the effective diameter of the annular threaded portion DSr. That is, the ratio of the effective diameter of the threaded portions is DSs:DSp:DSr.

The "effective diameter ratio of gears" of (G) represents the ratio of the effective diameter of sun gear DGs, the effective diameter of planetary gear DGp, and the effective diameter of annular gear DGr. That is, the ratio of the effective diameters of gears is DGs:DGp:DGr.

The "number of effective threads" of (H) represents the difference between the actual number of threads of threaded portion (the number of threads of (D)) and the reference number of threads. That is, when the motion converting mode is in the sun shaft displacement mode, the number of effective threads is a value obtained by subtracting the reference number of sun threads ZSS from the number of threads of sun threaded portion ZSs of (D). When the motion converting mode is in the annular shaft displacement mode, the number of effective threads is a value obtained by subtracting the reference number of annular threads ZSR from the number of threads of annular threaded portion ZSr of (D).

The "number of effective teeth" of (I) represents the difference between the actual number of teeth of gear (the number of teeth of (E)) and the reference number of teeth. That is, when the motion converting mode is in the sun shaft displacement mode, the number of effective teeth is a value obtained by subtracting the reference number of sun teeth ZGS from the number of teeth of sun gear ZGs of (E). Also, when the motion converting mode is in the annular shaft displacement mode, the number of effective teeth is a value obtained by subtracting the reference number of annular teeth ZGR from the number of teeth of annular gear ZGr of (E).

The specific setting manner of the above-mentioned items will be exemplified.

SETTING EXAMPLE 1

(A) Motion converting mode: "sun shaft displacement mode"
(B) Relationship of sun/planetary threaded portions: "reverse direction"
(C) Number of planetary shafts: "4"
(D) Number of threads ratio of threaded portions: "3:1:5"
(E) Number of teeth ratio of gears: "31:9:45"
(F) Effective diameter ratio of threaded portions: "3:1:5"
(G) Effective diameter ratio of gears: "3.44:1:5"
(H) Number of effective threads: "0"
(I) Number of effective teeth: "4"

SETTING EXAMPLE 2

(A) Motion converting mode: "sun shaft displacement mode"
(B) Relationship of sun/planetary threaded portions: "reverse direction"
(C) Number of planetary shafts: "9"
(D) Number of threads ratio of threaded portions: "4:1:5"

(E) Number of teeth ratio of gears: "31:10:50"
(F) Effective diameter ratio of threaded portions: "3:1:5"
(G) Effective diameter ratio of gears: "3.1:1:5"
(H) Number of effective threads: "1"
(I) Number of effective teeth: "1"

SETTING EXAMPLE 3

(A) Motion converting mode: "sun shaft displacement mode"
(B) Relationship of sun/planetary threaded portions: "forward direction"
(C) Number of planetary shafts: "9"
(D) Number of threads ratio of threaded portions: "−5:1:5"
(E) Number of teeth ratio of gears: "31:10:50"
(F) Effective diameter ratio of threaded portions: "3:1:5"
(G) Effective diameter ratio of gears: "3.1:1:50"
(H) Number of effective threads: "−8"
(I) Number of effective teeth: "1"

SETTING EXAMPLE 4

(A) Motion converting mode: "sun shaft displacement mode"
(B) Relationship of sun/planetary threaded portions: "reverse direction"
(C) Number of planetary shafts: "11"
(D) Number of threads ratio of threaded portions: "5:1:6"
(E) Number of teeth ratio of gears: "39:10:60"
(F) Effective diameter ratio of threaded portions: "4:1:6"
(G) Effective diameter ratio of gears: "3.9:1:6"
(H) Number of effective threads: "1"
(I) Number of effective teeth: "−1"

SETTING EXAMPLE 5

(A) Motion converting mode: "sun shaft displacement mode"
(B) Relationship of sun/planetary threaded portions: "reverse direction"
(C) Number of planetary shafts: "7"
(D) Number of threads ratio of threaded portions: "2:1:5"
(E) Number of teeth ratio of gears: "25:9:45"
(F) Effective diameter ratio of threaded portions: "3:1:5"
(G) Effective diameter ratio of gears: "2.78:1:5"
(H) Number of effective threads: "−1"
(I) Number of effective teeth: "−2"

SETTING EXAMPLE 6

(A) Motion converting mode: "sun shaft displacement mode"
(B) Relationship of sun/planetary threaded portions: "reverse direction"
(C) Number of planetary shafts: "5"
(D) Number of threads ratio of threaded portions: "11:2:14"
(E) Number of teeth ratio of gears: "58:11:77"
(F) Effective diameter ratio of threaded portions: "6:1:8"
(G) Effective diameter ratio of gears: "5.8:1.1:7.7"
(H) Number of effective threads: "1"
(I) Number of effective teeth: "3"

SETTING EXAMPLE 7

(A) Motion converting mode: "annular shaft displacement mode"
(B) Relationship of sun/planetary threaded portions: "reverse direction"
(C) Number of planetary shafts: "9"
(D) Number of threads ratio of threaded portions: "3:1:6"
(E) Number of teeth ratio of gears: "30:10:51"
(F) Effective diameter ratio of threaded portions: "3:1:5"
(G) Effective diameter ratio of gears: "3:1:5.1"
(H) Number of effective threads: "1"
(I) Number of effective teeth: "1"

<Effect of First Embodiment>

As described above, the first embodiment has the following advantages.

(1) The operations and advantages of the conversion mechanism 1 according to the first embodiment will now be described based on the comparison with the rotation/linear motion conversion mechanism (basic motion conversion mechanism) provided with the planetary shafts in which the front planetary gear and the rear planetary gear are formed integrally with the shaft main body.

In the above-mentioned basic motion conversion mechanism, if there is a displacement of the rotational phase between the front ring gear and the rear ring gear, the planetary shafts are arranged between the ring shaft and the sun shaft in an inclined state with respect to the central axis of the sun shaft (ring shaft) in accordance with the displacement of the phases. Thus, the engagement of the threaded portions among the ring shaft, the sun shaft, and the planetary shafts 4 become uneven, which locally increases pressure between the threaded portions and gears. As a result, local wear is caused, thus reducing the life of the conversion mechanism, and reducing the converting efficiency from rotational motion into linear motion due to the increase in wear.

In contrast, in the conversion mechanism 1 of the first embodiment, the planetary shafts 4 are configured to permit the front planetary gear 42 and the rear planetary gear 43 to rotate relative to each other. Thus, the displacement of the rotational phase between the front ring gear 22 and the rear ring gear 23 is absorbed. That is, when displacement of the rotational phases is caused between the front ring gear 22 and the rear ring gear 23, the displacement of the rotational phases is absorbed through the rotation of each rear planetary gear 43 with respect to the associated shaft main body 41 (relative rotation of the front planetary gear 42 and the rear planetary gear 43). This suppresses the inclination of the planetary shafts 4 caused by the displacement between the rotational phase of the front ring gear 22 and the rotational phase of the rear ring gear 23. Thus, even engagement of the threaded portions and even engagement of the gears are achieved among the ring shaft 2, the sun shaft 3, and the planetary shafts 4. As a result, the life of the conversion mechanism 1 and the converting efficiency of motion are improved.

(2) To suppress inclination of the planetary shafts 4, for example, the conversion mechanism 1 is manufactured as follows. That is, in the manufacturing process of the conversion mechanism 1, the displacement between the rotational phase of the front ring gear 22 and the rotational phase of the rear ring gear 23 is reduced by combining the components while controlling the rotational phases of the front ring gear 22 and the rear ring gear 23. However, in this case, since the rotational phases of the gears must be controlled strictly, the productivity is reduced. Furthermore, the displacement of the phases might not be sufficiently reduced although the rotational phases of the gears are controlled. Therefore, this countermeasure is not preferred.

In contrast, the conversion mechanism 1 of the first embodiment employs the configuration in which the displacement of the rotational phases is absorbed through the relative rotation of the front planetary gear 42 and the rear planetary gear 43 as described above. Therefore, the productivity is improved and the inclination of the planetary shafts 4 is suppressed in a more suitable manner.

(3) In each of the planetary shafts 4 of the conversion mechanism 1 of the first embodiment, the front planetary gear 42 and the externally threaded portion 44 are formed integrally with the shaft main body 41. As a result, during manufacture of the planetary shafts 4, the front planetary gear 42 and the externally threaded portion 44 can be rolled simultaneously, which improves the productivity.

(4) In the conversion mechanism 1 of the first embodiment, the radial position of the sun shaft 3 is restricted by the engagement of the threaded portions and the engagement of the gears, the front collar 51, and the rear collar 52. The radial position of the planetary shafts 4 is restricted by the engagement of the threaded portions and the engagement of the gears. As a result, since the conversion mechanism 1 is configured by a minimum number of components for restricting the planetary shafts 4, the planetary shafts 4 are suppressed from being inclined with respect to the axial direction of the sun shaft 3 in a suitable manner.

(5) In the conversion mechanism 1 of the first embodiment, the front collar 51 is provided with the oil holes 51H. Thus, since lubricant can be supplied to the engagement portion of the threaded portions and gears via the oil holes 51H, the life of the threaded portions and gears is improved. Also, since foreign objects in the conversion mechanism 1 are discharged outside as the lubricant is supplied via the oil holes 51H, reduction in the converting efficiency and malfunction due to the foreign objects are suppressed.

(6) In the conversion mechanism 1 of the first embodiment, the total number of teeth ratio ZGT and the total effective diameter ratio ZST are set to different values within the range in which the conditions (A) to (C) are satisfied. This achieves the operation manner in which the engagement of the threaded portions and the engagement of the gears are simultaneously obtained, and the operation manner in which the rotational phases of the planetary shafts 4 differ from one another. Thus, the torque fluctuation caused by the engagement of the gears is suppressed. Also, operating noise is reduced, and the durability is improved accordingly.

<Modified Embodiments>

The first embodiment may be modified as follows.

As the configuration for permitting the front planetary gear 42 and the rear planetary gear 43 to rotate relative to each other, the first embodiment employs the configuration in which the shaft main body 41 and the rear planetary gear 43 are separately formed. However, this may be modified as follows. The shaft main body 41, the front planetary gear 42, and the rear planetary gear 43 are formed separately, and combined so that these components rotate relative to one another. This permits the front planetary gear 42 and the rear planetary gear 43 to rotate relative to each other.

The conversion mechanism 1 of the first embodiment is a conversion mechanism that operates based on the following operation principle. That is, rotational motion is converted into linear motion through the difference between the rotational angles generated in accordance with the difference between the number of teeth ratio and the number of threads ratio of the sun shaft 3 or the ring shaft 2 to the planetary shafts 4 in two types of planetary deceleration mechanisms. In contrast, the conversion mechanism of the embodiment described below is a conversion mechanism that operates based on the following operation principle. The conversion mechanism of a second embodiment differs from the conversion mechanism 1 of the first embodiment in that the configuration described below is employed, but other configuration is the same as the conversion mechanism 1 of the first embodiment.

<Operation Principle of Conversion Mechanism 1>

When the planetary gear type deceleration mechanism is configured by helical gears, due to the relationship of the rotation direction of the gears, the tooth trace of the sun gear and the tooth trace of the planetary gear are set to opposite directions from each other, and the torsion angles of the gears are set to the same size. Also, as the ring gear, a gear having the torsion angle that is in the same direction as the planetary gear is employed.

Therefore, to configure a deceleration mechanism (planetary thread type deceleration mechanism) that is the same as the planetary gear type deceleration mechanism by the engagement of the threaded portions, the pitch and lead angle of the sun threaded portion corresponding to the sun gear, the planetary threaded portion corresponding to the planetary gear, and the annular threaded portion corresponding to the ring gear are set to the same size, and the sun threaded portion has the threaded portion in the opposite direction. In such a planetary thread type deceleration mechanism, none of the components is displaced in the axial direction with respect to other component. However, assuming that such a state where the relative displacement in the axial direction does not occur is referred to as a reference state, the sun threaded portion or the annular threaded portion can be displaced in the axial direction by changing the lead angle of the sun threaded portion or the annular threaded portion from the reference state while achieving the engagement of the threaded portions.

In general, to completely engage two threaded portions, the pitch of the threads needs to be set to the same size. Also, in the planetary thread type deceleration mechanism, to equalize all the lead angles of the sun threaded portion, the planetary threaded portions, and the annular threaded portion, the ratio of the reference pitch diameter of the sun threaded portion, the planetary threaded portions, and the annular threaded portion needs to be matched with the ratio of the number of threads of the sun threaded portion, the planetary threaded portions, and the annular threaded portion.

Therefore, in the planetary thread type deceleration mechanism, the conditions in which none of the components is displaced in the axial direction are the following conditions (1) to (3).

(1) Relationship in which only the sun threaded portion is a reverse thread among the sun threaded portion, the planetary threaded portions, and the annular threaded portion.

(2) The pitches of the threads of the sun threaded portion, the planetary threaded portions, and the annular threaded portion are the same size.

(3) The ratio of the reference pitch diameter of the sun threaded portion, the planetary threaded portions, and the annular threaded portion is the same size as the ratio of the number of threads of the sun threaded portion, the planetary threaded portions, and the annular threaded portion.

In contrast, when the number of threads of the sun threaded portion or the annular threaded portion is increased or decreased from the number of threads of the above (2) by an integer number of threads, the sun threaded portion or the annular threaded portion is displaced in the axial direction with respect to the other threaded portions. Thus, the second embodiment reflects the above idea in the configuration of the conversion mechanism 1. This enables the conversion mechanism 1 to convert rotational motion into linear motion.

When the sun shaft displacement mode is employed, the conversion mechanism 1 is configured to satisfy the following conditions (A) to (D). When the annular shaft displacement mode is employed, the conversion mechanism 1 is configured to satisfy the following conditions (A) to (C) and (E).

(A) The torsion direction of the externally threaded portion 34 of the sun shaft 3 is opposite to the torsion direction of the externally threaded portions 44 of the planetary shafts 4.

(B) The torsion direction of the internally threaded portion 24 of the ring shaft 2 is the same as the torsion direction of the externally threaded portions 44 of the planetary shafts 4.

(C) The pitches of the threads of the ring shaft 2, the sun shaft 3, and the planetary shafts 4 are the same.

(D) As for the relationship between the reference pitch diameter and the number of threads of the threaded portions of the ring shaft 2, the sun shaft 3, and the planetary shafts 4, assuming that the relationship when none of the ring shaft 2, the sun shaft 3, and the planetary shafts 4 is relatively displaced in the axial direction is referred to as a reference relationship, the number of threads of the externally threaded portion 34 of the sun shaft 3 is greater than or smaller than the number of threads in the reference relationship by an integer value.

(E) As for the relationship between the reference pitch diameter and the number of threads of the threaded portions of the ring shaft 2, the sun shaft 3, and the planetary shafts 4, assuming that the relationship when none of the ring shaft 2, the sun shaft 3, and the planetary shafts 4 is relatively displaced in the axial direction is referred to as a reference relationship, the number of threads of the internally threaded portion 24 of the ring shaft 2 is greater than or smaller than the number of threads in the reference relationship by an integer value.

<Setting Manner of Number of Teeth and Number of Threads>

In the conversion mechanism 1, assuming that there is no relative displacement in the axial direction among the ring shaft 2, the sun shaft 3, and the planetary shafts 4, the relationship represented by [expression 81] is established between the reference pitch diameter and the number of threads of the threaded portions.

$$DSr:DSs:DSp=ZSr:ZSs:ZSp \qquad \text{[expression 81]}$$

In a case where the number of threads of the internally threaded portion 24 of the ring shaft 2, the externally threaded portion 34 of the sun shaft 3, and the externally threaded portions 44 of the planetary shafts 4 when the relationship of [expression 81] is satisfied is assumed to be a "reference number of threads", and the difference between the number of threads of threaded portions and the reference number of threads is assumed to be the "number of effective threads", the ring shaft 2 or the sun shaft 3 can be moved linearly in the conversion mechanism 1 by setting the "number of effective teeth" of one of the ring shaft 2 and the sun shaft 3 to a value other than "0". That is, when the reference number of threads of the internally threaded portion 24 of the ring shaft 2 is referred to as the reference number of annular threads ZSR, and the reference number of threads of the externally threaded portion 34 of the sun shaft 3 is referred to as the reference number of sun threads ZSS, the ring shaft 2 or the sun shaft 3 is moved linearly by setting the number of threads such that one of the following [expression 82] and [expression 83] is satisfied.

$$ZSr-ZGR \neq 0 \qquad \text{[expression 82]}$$

$$ZSs-ZGS \neq 0 \qquad \text{[expression 83]}$$

The specific setting manner will be given in "Specific Examples of Setting Manner of Number of Threads".

<Specific Example of Setting Manner of Number of Threads>

The main items representing the specifications of the conversion mechanism 1 of the second embodiment include the following items (A) to (E) including the ratio of the reference pitch diameter and the ratio of the number of teeth.

(A) Motion converting mode (B) Relationship of sun/planetary threaded portions (C) Number of the planetary shafts (D) Number of threads ratio of threaded portions (E) Number of effective threads The details of the above-mentioned items will now be described.

The "motion converting mode" of (A) represents the operation mode for converting rotational motion into linear motion. That is, when linearly moving the sun shaft 3 by the rotational motion of the ring shaft 2, the motion converting mode is in the "sun shaft displacement mode". Also, when linearly moving the ring shaft 2 by the rotational motion of the sun shaft 3, the motion converting mode is in the "annular shaft displacement mode".

The "relationship of sun/planetary threaded portions" of (B) represents the relationship of the torsion direction between the externally threaded portion 34 of the sun shaft 3 and the externally threaded portions 44 of the planetary shafts 4. That is, when the torsion direction of the externally threaded portion 34 of the sun shaft 3 and the torsion direction of the externally threaded portions 44 of the planetary shafts 4 are opposite to each other, the relationship of sun/planetary threaded portions is "reverse direction". Also, when the torsion direction of the externally threaded portion 34 of the sun shaft 3 and the torsion direction of the externally threaded portions 44 of the planetary shafts 4 are the same as each other, the relationship of sun/planetary threaded portions is "forward direction".

The "number of planetary shafts" of (C) represents the number of the planetary shafts 4 arranged around the sun shaft 3.

The "number of threads ratio of threaded portions" of (D) represents the ratio of the number of threads of sun threaded portion ZSs, the number of threads of planetary threaded portion ZSp, and the number of threads of annular threaded portion ZSr. That is, the number of threads ratio of threaded portions is ZSs:ZSp:ZSr.

The "number of effective threads" of (E) represents the difference between the actual number of threads of threaded portion (the number of threads of (D)) and the reference number of threads. That is, when the motion converting mode is in the sun shaft displacement mode, the number of effective threads is a value obtained by subtracting the reference number of sun threads ZSS from the number of threads of sun threaded portion ZSs of (D). Also, when the motion converting mode is in the annular shaft displacement mode, the number of effective threads is a value obtained by subtracting the reference number of annular threads ZSR from the number of threads of annular threaded portion ZSr of (D).

The specific setting manner of the items will be exemplified below.

SETTING EXAMPLE 1

(A) Motion converting mode: "sun shaft displacement mode"
(B) Relationship of sun/planetary threaded portions: "reverse direction"
(C) Number of planetary shafts: "9"
(D) Number of threads ratio of threaded portions: "4:1:5"
(F) Number of effective threads: "1"

SETTING EXAMPLE 2

(A) Motion converting mode: "annular shaft displacement mode"
(B) Relationship of sun/planetary threaded portions: "reverse direction"
(C) Number of planetary shafts: "9"
(D) Number of threads ratio of threaded portions: "3:1:6"
(E) Number of effective threads: "1"

<Number of Teeth Ratio and Effective Diameter Ratio>

The conversion mechanism 1 of the second embodiment further employs the following setting manner for the number of teeth and the reference pitch diameter of the gears, and the number of threads and the reference pitch diameter of threaded portions.

[A] The effective diameter of planetary threaded portion DSp and the effective diameter of planetary gear DGp are set to the same size. Also, the ratio of the number of teeth of planetary gear ZGp and the number of teeth of annular gear ZGr is set to the same size as the ratio of the effective diameter of planetary threaded portion DSp and the effective diameter of annular threaded portion DSr. Thus, the ratio of the number of teeth of planetary gear ZGp and the number of teeth of annular gear ZGr is equal to the ratio of the number of threads of planetary threaded portion ZSp and the number of threads of annular threaded portion ZSr. Thus, the relationship of the number of rotation of the ring shaft 2 and the planetary shafts 4 is accurately restricted by the ratio of the number of teeth of the ring gears 22, 23 and the planetary gears 42, 43. Also, the ratio of the effective diameter of planetary threaded portion DSp and the effective diameter of annular threaded portion DSr is maintained to the ratio of effective diameter that should be originally set.

[B] The effective diameter of planetary threaded portion DSp and the effective diameter of planetary gear DGp are set to the same size. Also, the ratio of the number of teeth of planetary gear ZGp and the number of teeth of sun gear ZGs is set to the same size as the ratio of the effective diameter of planetary threaded portion DSp and the effective diameter of sun threaded portion DSs. Thus, the ratio of the number of teeth of planetary gear ZGp and the number of teeth of sun gear ZGs is equal to the ratio of the number of threads of planetary threaded portion ZSp and the number of threads of sun threaded portion ZSs. Thus, the relationship of the number of rotation of the sun shaft 3 and the planetary shafts 4 is accurately restricted by the ratio of the number of teeth of the sun gears 32, 33 and the planetary gears 42, 43. Also, the ratio of the effective diameter of planetary threaded portion DSp and the effective diameter of sun threaded portion DSs is maintained to the ratio of effective diameter that should be originally set.

<Advantages of Embodiment>

As described above, the conversion mechanism 1 according to the second embodiment has the advantages that are the same as the advantages (1) to (4) and (5) of the first embodiment.

<Modified Embodiments>

The second embodiment may be modified as follows.

In the second embodiment, at least one of the front ring gear 22 and the rear ring gear 23 may be omitted. That is, the configuration may be modified such that at least one of the front planetary gear 42 and the rear planetary gear 43 is not engaged with the ring shaft 2.

In the second embodiment, at least one of the front sun gear 32 and the rear sun gear 33 may be omitted. That is, the configuration may be modified such that at least one of the front planetary gear 42 and the rear planetary gear 43 is not engaged with the sun shaft 3.

The invention claimed is:

1. A rotation/linear motion conversion mechanism, comprising:
   an annular shaft provided with a space extending in an axial direction therein, the annular shaft including an internally threaded portion and first and second annular gears, the annular gears being internal gears;
   a sun shaft arranged inside the annular shaft, the sun shaft including an externally threaded portion and first and second sun gears, the sun gears being external gears; and
   a plurality of planetary shafts arranged around the sun shaft, each planetary shaft including an externally threaded portion and first and second planetary gears, the planetary gears being external gears,
   wherein the externally threaded portion of each planetary shaft is engaged with the internally threaded portion of the annular shaft and with the externally threaded portion of the sun shaft, each first planetary gear is engaged with the first annular gear and with the first sun gear, each second planetary gear is engaged with the second annular gear and with the second sun gear, and wherein the conversion mechanism converts rotational motion of one of the annular shaft and the sun shaft into linear motion of the other one of the annular shaft and the sun shaft along the axial direction through sun-and-planet motion of the planetary shafts, and
   wherein the planetary shafts are configured to permit relative rotation between the first planetary gear and the second planetary gear.

2. The conversion mechanism according to claim 1, wherein each planetary shaft is configured by combination of a planetary shaft main body formed integrally with the externally threaded portion and the first planetary gear, and the second planetary gear formed separately from the planetary shaft main body, and wherein the second planetary gear is rotatable with respect to the planetary shaft main body.

3. The conversion mechanism according to claim 1, wherein each planetary shaft is configured by combination of a planetary shaft main body formed integrally with the externally threaded portion, and the first planetary gear and the second planetary gear, which are formed separately from the planetary shaft main body, and wherein the first planetary gear and the second planetary gear are rotatable with respect to the planetary shaft main body.

4. The conversion mechanism according to claim 1, wherein the annular shaft is configured by combination of an annular shaft main body formed integrally with the internally threaded portion, and the first annular gear and the second annular gear, which are formed separately from the annular shaft main body, and wherein the first annular gear and the second annular gear are rotatable with respect to the planetary shaft main body.

5. The conversion mechanism according to claim 1, wherein the internally threaded portion, the first annular gear, and the second annular gear of the annular shaft move integrally.

6. The conversion mechanism according to claim 1, wherein the sun shaft is configured by combination of a sun shaft main body formed integrally with the externally threaded portion and the first sun gear, and the second sun gear formed separately from the sun shaft main body, and wherein the second sun gear moves with respect to the sun shaft main body.

7. The conversion mechanism according to claim 1, wherein the externally threaded portion, the first sun gear, and the second sun gear of the sun shaft are rotatable integrally.

8. The conversion mechanism according to claim 1, wherein, when the ratio of a number of teeth of each annular gear, a number of teeth of each sun gear, and a number of teeth of each planetary gear is referred to as a number of teeth ratio, and the ratio of a reference pitch diameter of each annular gear, a reference pitch diameter of each sun gear, and a reference pitch diameter of each planetary gear is referred to as an effective diameter ratio, the number of teeth ratio and the effective diameter ratio are set to different values.

9. The conversion mechanism according to claim 1, wherein the radial position of the sun shaft is restricted by a bearing element secured to the annular shaft, the engagement of the threaded portions, and the engagement of the gears, and wherein the radial position of the planetary shaft is restricted by the engagement of the threaded portions and the engagement of the gears.

10. The conversion mechanism according to claim 9, wherein the bearing element is a pair of bearings secured to the annular shaft to close the opening portions at the ends of the annular shaft, the bearing element is provided with holes for supplying lubricant to engagement portion of the threaded portions and the engagement portion of the gears among the annular shaft, the sun shaft, and the planetary shaft.

11. The conversion mechanism according to claim 1, wherein the first annular gear and the second annular gear have the same shape, the first sun gear and the second sun gear have the same shape, and the first planetary gear and the second planetary gear have the same shape.

12. The rotation/linear motion conversion mechanism according to claim 11, wherein, when the number of threads of the externally threaded portion of the planetary shaft is referred to as a number of threads of planetary threaded portion, the number of threads of the externally threaded portion of the sun shaft is referred to as a number of threads of sun threaded portion, the number of teeth of the planetary gear is referred to as a number of teeth of planetary gear, and the number of teeth of the sun gear is referred to as a number of teeth of sun gear, the ratio of the number of threads of sun threaded portion to the number of threads of planetary differs from the ratio of the number of teeth of sun gear to the number of teeth of planetary gear, and
wherein the sun shaft is linearly moved through the sun-and-planet motion of the planetary shafts accompanying the rotational motion of the annular shaft.

13. The conversion mechanism according to claim 11, wherein, when the number of threads of the externally threaded portion of the planetary shaft is referred to as a number of threads of planetary threaded portion, the number of threads of the externally threaded portion of the annular shaft is referred to as a number of threads of annular threaded portion, the number of teeth of the planetary gear is referred to as a number of teeth of planetary gear, and the number of teeth of the annular gear is referred to as a number of teeth of annular gear, the ratio of the number of threads of annular threaded portion to the number of threads of planetary threaded portion differs from the ratio of the number of teeth of annular gear to the number of teeth of planetary gear, and
wherein the annular shaft is linearly moved through the sun-and-planet motion of the planetary shafts accompanying the rotational motion of the sun shaft.

14. The conversion mechanism according to claim 1, wherein a torsion direction of the internally threaded portion of the annular shaft and the torsion direction of the externally threaded portions of the planetary shafts are in the same direction as each other, the torsion direction of the externally threaded portion of the sun shaft and the torsion direction of the externally threaded portions of the planetary shafts are in the opposite direction to each other, and wherein the internally threaded portion of the annular shaft, the externally threaded portion of the sun shaft, and the externally threaded portions of the planetary shafts have the same pitches as one another,
wherein, in a case where a relationship of a reference pitch diameter and a number of threads of the threaded portions of the annular shaft, the sun shaft, and the planetary shafts when the relative displacement in the axial direction does not occur among the annular shaft, the sun shaft, and the planetary shafts is referred to as a reference relationship, the number of threads of the externally threaded portion of the sun shaft differs from the number of threads in the reference relationship, and
wherein the sun shaft is linearly moved through the sun-and-planet motion of the planetary shafts accompanying the rotational motion of the annular shaft.

15. The conversion mechanism according to claim 1, wherein a torsion direction of the internally threaded portion of the annular shaft and a torsion direction of the externally threaded portions of the planetary shafts are in the same direction as each other, the torsion direction of the externally threaded portion of the sun shaft and the torsion direction of the externally threaded portions of the planetary shafts are in the opposite direction to each other, and wherein the internally threaded portion of the annular shaft, the externally threaded portion of the sun shaft, and the externally threaded portions of the planetary shafts have the same pitches as one another,
wherein, in a case where the relationship of the reference pitch diameter and the number of threads of the threaded portions of the annular shaft, the sun shaft, and the planetary shafts when the relative displacement in the axial direction does not occur among the annular shaft, the sun shaft, and the planetary shaft is referred to as a reference relationship, the number of threads of the internally threaded portion of the annular shaft differs from the number of threads in the reference relationship, and
wherein the annular shaft is linearly moved through the sun-and-planet motion of the planetary shafts accompanying the rotational motion of the sun shaft.

* * * * *

UNITED STATES PATENT AND TRADEMARK OFFICE
CERTIFICATE OF CORRECTION

| | |
|---|---|
| PATENT NO. | : 8,162,794 B2 |
| APPLICATION NO. | : 12/308105 |
| DATED | : April 24, 2012 |
| INVENTOR(S) | : Kohei Hori et al. |

It is certified that error appears in the above-identified patent and that said Letters Patent is hereby corrected as shown below:

Title page, inventor: Item (75), change "Motohiro Tsuzukui, Toyota (JP)" to --Motohiro Tsuzuki, Toyota (JP)--.

Signed and Sealed this
Third Day of July, 2012

David J. Kappos
*Director of the United States Patent and Trademark Office*